Figures 1, 2:
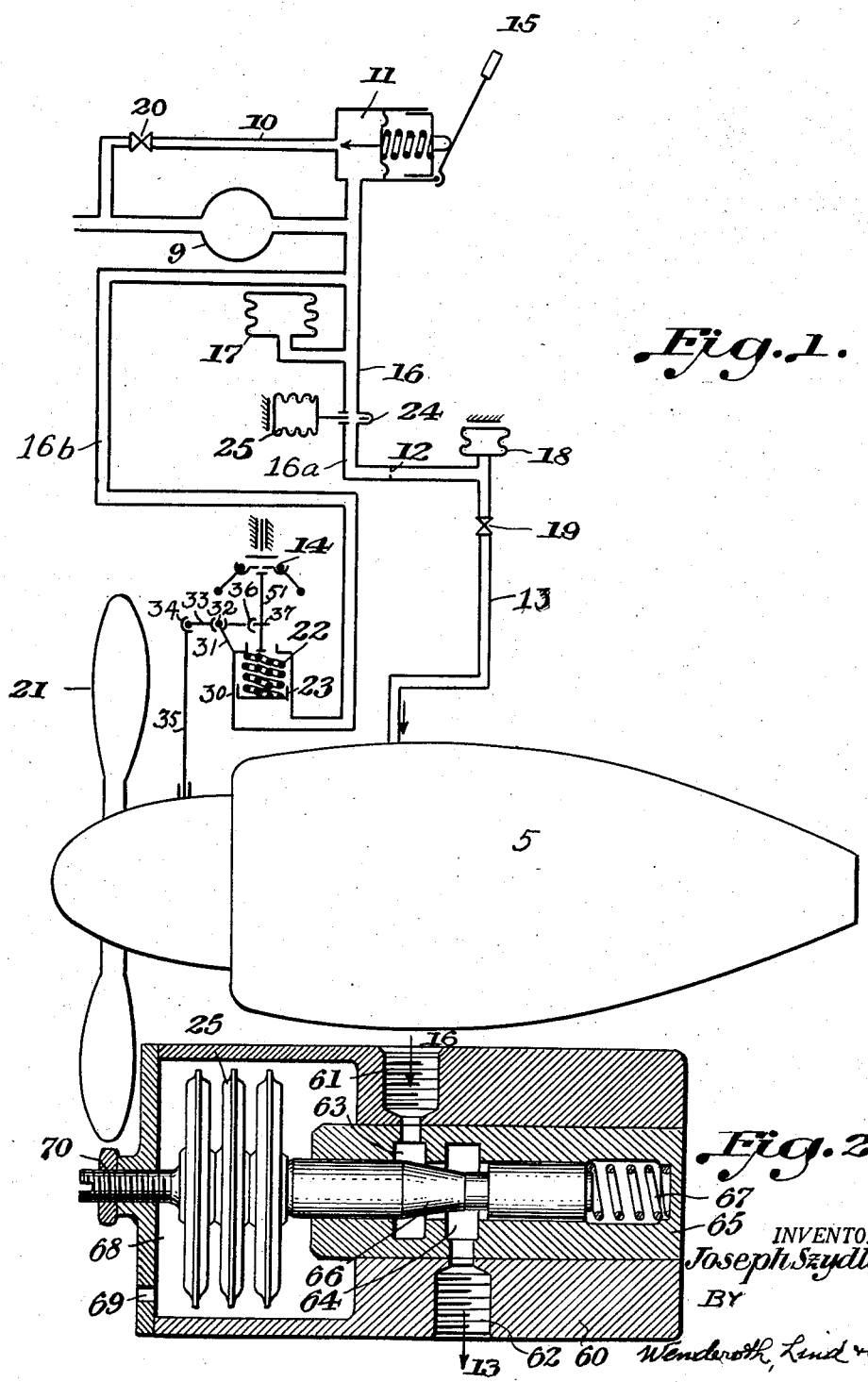

INVENTOR.
Joseph Szydlowski

United States Patent Office 2,891,626
Patented June 23, 1959

2,891,626

FEEDING OF FUEL TO GAS TURBINES AND PROPELLER PITCH CONTROL

Joseph Szydlowski, Turbomeca, Bordes, France

Application July 8, 1954, Serial No. 442,106

Claims priority, application France January 4, 1949

6 Claims. (Cl. 170—135.72)

This application is a continuation-in-part of application Serial No. 126,144 filed November 8, 1949, entitled "Feeding of Gas Turbines" now abandoned.

In order to remove well known drawbacks of conventional injection pumps used for feeding fuel to gas turbines chiefly when operating under very high pressure, I have provided, as the chief object of my invention, an arrangement for feeding fuel to gas turbines wherein the output of fuel delivered by a pump under a pressure of a few atmospheres is adjusted as a function of the desired rate of running or of the load of the turbine through the action of an adjustable speed governor on the pressure prevailing in a by-pass channel fed by said pump, located on the upstream side of the regulator and including an adjustable valve providing a more regular flow in said by-pass.

A further object of my invention is to cut out any sudden modification in the output of fuel during acceleration periods inside the feed system of the type disclosed, through the provision of damping means on the downstream side of the adjustable valve.

A further object of the invention consists in providing, with the view of increasing the output of fuel inside the feed system of the type disclosed during a short time at the moment of ignition of fuel in the machine, a transient injection means located between the adjustable valve and a cock used for the general closing of the admission into the turbine or again a cock inserted in the by-pass and adapted to prevent said adjustable valve from playing its part.

My invention has furthermore for its object industrial applications of the system feeding gas turbines such as turbines operating under constant speed conditions such as those driving electric generators, or of reaction jet turbines or turbines driving propellers and such as gas turbines of the type described in my co-pending U.S. application Serial No. 126,143, filed November 8, 1949, entitled: "Propelling Group" now abandoned and associated more particularly with the combustion chamber of the type disclosed in my further co-pending U.S. application Serial No. 126,141, filed November 8, 1949, and entitled: "Combustion Chamber and Any Turbine Power Plant" now abandoned.

When feeding a reaction jet turbine, the speed governor acts only as a speed limiting means and under standard cruising conditions, the power being less than the maximum available power and the pilot adjusts the thrust and causes the pressure to vary through adjustment of the adjustable valve.

The feed system may also include a speed governor adjusted for acting in the range of high thrusts and an adjustable valve adjusted for acting in the range of reduced thrusts.

In the case of the feeding of a gas turbine associated with a propeller the speed governor does not act directly on the fuel output but only indirectly on the same during a modification of the pitch of the screw propeller whereby for a given altitude a predetermined feed of fuel provides for a constant speed of rotation of the propeller. The governor is associated with means for adjusting its speed of operation under the influence of the pressure prevailing on the upstream side of a restricted orifice provided in the feeding line. The cross-section of such restricted orifice remains constant while the barometric means for adjusting the output located upstream of said orifice is thus disposed between said adjusting means and said restricted orifice.

A further object of the invention is to provide a construction where the pilot of an aircraft can determine the output of the engine as a percent of the maximum output possible at any altitude by means of a hand throttle. The speed is then maintained constant despite the fact that the maximum horse power that the engine can deliver varies with the altitude since the fuel flow required, changes as a function of the altitude.

With the above and other objects in view which will become apparent from the detailed description below and set forth in the claims, one preferred form is shown in the drawings in which:

Figure 1 illustrates diagrammatically a system for feeding a gas turbine associated with a propeller in accordance with my invention, and Figure 2 is a transverse cross-sectional view of the barometric valve incorporated in the embodiment shown in Figure 1.

Referring to Figure 1 the gas turbine which is of the type disclosed in my first above-mentioned co-pending application includes a compressor, an annular combustion chamber of the type disclosed in my second above-mentioned co-pending application and a turbine. A rotary injector of the type disclosed in the same last mentioned co-pending application is seated directly inside the rotary compressor and turbine system and produces a sufficient atomizing of the fuel at all rates of operation without requiring the use of any further auxiliaries.

The fuel is fed through a stationary port into a hollow rotating shaft operatively connecting the compressor with the turbine. The port is provided at the compressor end of the shaft and the fuel is driven centrifugally inside a circular chamber of a larger diameter forming the flaring end of the hollow shaft and which is provided with peripheral ports out of which the fuel is injected into the combustion chamber. All of the above construction is enclosed in the ancelle 5 and is more fully shown and described in my co-pending application filed concurrently herewith.

The feeding of the combustion chamber with fuel is obtained through the means described hereinafter. A fuel pump 9 producing a pressure of a few atmospheres feeds on one hand a bypass 10 in which is inserted an adjustable valve or control means 11 for limiting the pressure to a predetermined value and on the other hand it feeds through a fixed or a precalibrated restricted orifice 12, a pipe 13 which feeds the engine.

The pressure defined by the valve or control means 11 may be adjusted by a pilot handle 15 within a very large range of pressures.

The valve or control means 11 provides for consistency of the pressure for a determined position of the handle 15 through removal of the required amount of fuel through the bypass 10, recycling said fuel into the pump.

The amount of fuel fed to the engine depends consequently only on the difference between the pressure prevailing in the admission pipe 16 ahead of the restricted orifice 12 and the fuel pressure prevailing within the fuel intake duct of said engine. The control means 11 is associated with the delivery side of the pump and controls the pressure in the admission pipe 16 ahead of the restricted orifice 12.

In order to adjust the speed of rotation of the propeller screw 21 as a function of the output of fuel, in accordance with the required power, the speed governor 14 is designed in a manner such that the predetermined value of the speed from which it becomes operative for modifying the pitch of the propeller may be modified through the compressing of a spring 22. Said compression of spring is obtained by means of a piston 23 moving under the action of the pressure inside the fuel pipes on the upstream side of the restricted orifice 12, the cross-section of which remains constant in this case, said orifice 12 comprising a nozzle or a jet or the like.

The more the pressure rises in said fuel circuit upstream of said restricted orifice 12 the more the spring 22 is compressed and consequently the speed at which the governor 14 becomes operative to adjust the pitch of the propeller is increased.

The piston 23 is slidable in a cylinder 30 and the spring 22 abuts at its top surface the top of the cylinder 30. Fixed to the cylinder 30 in any desired way is a rod 31 whose free end 32 serves as a pivot for the cross-rod 33. At one end the cross-rod 33 is pivotally connected at 34 to the rod 35 which actuates the means for changing the pitch of the propeller 21. The other end of the rod 33 is provided with a yoke 36 which engages a cross piece 37 fixed upon the extension 51 of the speed governor 14. The general assembly of the governor 14 shown in the copending application filed concurrently herewith except that in this case the speed governor controls the actuation of the pitch changing mechanism of the propeller 21 instead of serving as a valve control.

This general feed system may incorporate further improvements: thus in order to prevent too sudden a modification in the amount of fuel that might produce during acceleration periods too great a rise in the temperature of the turbine or again might lead to an extinction inside the combustion chamber, it is possible to introduce on the upstream side of the restricted orifice 12 a damping element 17 constituted for instance by an air-filled capacity or a yielding diaphragm adapted when the pressure increases rapidly to receive a part of the fuel and thus to eliminate any too sudden modifications in the throughput.

Experience has shown furthermore that at the moment of ignition of the fuel at the starting of the turbine, it is necessary to increase the output of fuel during a short time and to reduce it again to normal value immediately after ignition in order to avoid any excess heating of the turbine. To this end, there is inserted a damping element 18 between the restricted orifice 12 and the closing cock 19 inserted in the fuel feed pipe 13. The machine being driven by any suitable starting means such as an electric starter for instance, the cock 19 is first held closed until the speed of rotation required for ignition is reached and the pressure of fuel in the pipe 13 increases so that the damping capacity 18 is partly filled. As soon as the speed of rotation required for starting is reached, the cock 19 is opened, the pressure drops and there flows in addition to the amount of fuel passing normally through the restricted orifice 12 a portion of the fuel contained in the damping capacity 18 which allows ignition of the apparatus.

In order to provide for the output of fuel required for ignition, it is possible instead of resorting to the damping member 18, to insert in the by pass 10 a cock 20 that is closed at the moment of ignition and prevents the valve 11 from playing its part.

The relationship between the speed and the output of fuel varies with altitude and, as a matter of fact, for a constant speed the output of fuel is less at high altitudes and conversely.

In order to allow a simultaneous adjustment in accordance with altitude for the output of fuel and for the speed as defined by the governor, there is inserted between the piston 23 and the fixed restricted orifice 12 an adjustable valve assembly 24 controlled by a barometric capsule 25. This barometric capsule decreases the cross-section through said valve assembly 24 when the altitude increases and conversely.

As illustrated in Fig. 2, the body 60 of the adjustable valve assembly 24 is connected through tapped openings 61 and 62 with the pipes 16 and 16a. These openings communicate with chambers 63 and 64 provided inside an inner body 65 and said chambers may be set in communication with one another through the agency of the valve 66 connected on one hand with a spring 67 and on the other hand with the barometric capsule 25 housed inside a chamber 68 within the body 60 and communicating with the atmosphere through a gauged port 69. Any adjustment of the capsule 25 is had through an adjusting screw 70.

The pilot determines the output of the engine as a percent of the maximum output possible at any altitude by means of the hand throttle 15. At any percentage of the maximum output the speed is maintained constant despite the fact that the maximum horse power that the engine can deliver varies with the altitude, inasmuch as the fuel flow required changes as a function of the altitude for any given percentage of the maximum horsepower. The barometric control 25 is used to accomplish this.

The operation of the construction set forth above is therefore as follows: As the airplane attains higher altitude the pilot sets the hand throttle 15 at the desired percent of maximum output of the engine. As the ascent continues the closing of the barometric valve 24 causes a decrease in pressure in the fuel line 16a upstream of restricted orifice 12, thus decreasing the fuel flow supplied to the engine. However, the pressure in line 16 and consequently in 16b remains constant due to the operation of control means or by-pass valve 11, thus maintaining constant pressure on piston 23 and therefore constant engine speed.

If the pilot desires to increase the percent power, he pushes handle 15 forward, compressing the spring in the by-pass 11, increasing the pressure in lines 16 and 16b, thus the pressure drop across restricted orifice 12 and the pressure on piston 23 are increased; the fuel flow and engine speed are therefore increased simultaneously.

Obviously, without widening the scope of the invention, as defined in accompanying claims, the means for adjusting both the valve and the regulator may be different from those defined hereinabove solely by way of examples. The same is the case as concerns the means for cutting out sudden variations in output and for ensuring a supplementary feed at the moment of ignition.

I claim:

1. In a gas turbine plant operatively associated with a propeller the combination comprising means for changing the pitch of said propeller, a speed controlled governor controlling said pitch changing means, a low pressure fuel pump, a delivery pipe for said pump opening into the input of the turbine combustion chamber, a by-pass for said delivery pipe to return a portion of the delivered fuel back from the delivery pipe into the input of the pump, an adjustable valve in said bypass to positively adjust the pressure in said bypass, a fixed restricted orifice in said delivery pipe, means for controlling the predetermined value of the speed at which said speed controlled governor becomes operative for modifying the pitch of said propeller dependent upon the action of the pressure inside said delivery pipe upstream of said fixed restricted orifice and a barometric restricted orifice controlling the fuel supplied to said chamber located between said fixed restricted orifice and said last named means, whereby at any percentage of the maximum output of power the speed is maintained constant despite the fact that the maximum horse power that the engine can deliver varies with the altitude since the fuel flow required changes as a function of the altitude for any given percentage of the maximum horsepower.

2. In a gas turbine plant operatively associated with a propeller the combination comprising means for changing the pitch of said propeller, a speed controlled governor controlling said pitch changing means, a low pressure fuel pump, a delivery pipe for said pump opening into the input of the turbine combustion chamber, a bypass for said delivery pipe to return a portion of the delivered fuel back from the delivery pipe into the input of the pump, an adjustable valve in said bypass to positively adjust the pressure in said bypass, a fixed restricted orifice in said delivery pipe, means for controlling the predetermined value of the speed at which said speed controlled governor becomes operative for modifying the pitch of said propeller dependent upon the action of the pressure inside said delivery pipe upstream of said fixed orifice, a barometric valve controlling the fuel supplied to said chamber located between said fixed orifice and said last named means, and damping means for damping any sudden variation in the fuel output inserted in said delivery pipe whereby at any percentage of the maximum output of power the speed is maintained constant despite the fact that the maximum horse power that the engine can deliver varies with the altitude since the fuel flow required changes as a function of the altitude for any given percentage of the maximum horsepower.

3. In a gas turbine plant operatively associated with a propeller the combination comprising means for changing the pitch of said propeller, a speed controlled governor controlling said pitch changing means, a low pressure fuel pump, a delivery pipe for said pump opening into the input of the turbine combustion chamber, a bypass for said delivery pipe to return a portion of the delivered fuel back from the delivery pipe into the input of the pump, an adjustable valve in said bypass to positively adjust the pressure in said bypass, a restricted orifice in said delivery pipe, means for controlling the predetermined value of the speed at which said speed controlled governor becomes operative for modifying the pitch of said propeller dependent upon the action of the pressure inside said delivery pipe upstream of said restricted orifice and a barometric valve controlling the fuel supplied to said chamber located between said restricted orifice and said last named means, a closing cock inserted in the delivery pipe near the turbine input end, said cock being closed at the beginning of the starting of the turbine plant, and transient injection means cooperating with said delivery pipe just ahead of said cock for the transient reception of an amount of fuel at the beginning of the starting of the turbine plant, when said cock is closed, and for delivering in bulk said amount of fuel through said delivery pipe at the moment of the opening of said cock, whereby at any percentage of the maximum output of power the speed is maintained constant despite the fact that the maximum horse power that the engine can deliver varies with the altitude since the fuel flow required changes as a function of the altitude for any given percentage of the maximum horsepower.

4. In a gas turbine plant, operatively associated with a propeller screw, a fuel feeding system including a fuel pump operating under a small pressure, a delivery pipe for said pump opening into the input of the turbine combustion chamber, said delivery pipe having a restricted orifice therein, a by-pass for said delivery pipe to return a portion of the delivered fuel back from the delivery pipe into the input of the pump, an adjustable valve in said by-pass to positively adjust the pressure in said delivery pipe upstream of said restricted orifice, a speed-controlled governor for said turbine, means operable by said governor to control the pitch of the propeller screw and thereby the output of fuel passing through the delivery pipe, a predetermined output of fuel producing at a predetermined altitude a constant speed of rotation of the propeller screw, means connected with the governor for adjusting its operative speed under the action of the pressure prevailing in the part of the delivery pipe which is comprised between said restricted orifice and the branching of the by-pass, altitude control means for regulating the action of said adjusting means and a barometric capsule controlling said altitude control means, whereby the pressure existing in the part of said delivery pipe located downstream said restricted orifice is maintained for each operative position of the governor at the value attained before said governor begins to act on said pitch controlling means.

5. In a gas turbine plant, operatively associated with a propeller screw, a fuel feeding system including a fuel pump operating under a small pressure, a delivery pipe for said pump opening into the input of the turbine combustion chamber, a by-pass for said delivery pipe to return a portion of the delivered fuel back from the delivery pipe into the input of the pump, an adjustable valve in said by-pass to positively adjust the pressure in the by-pass, a restricted orifice inserted in the delivery pipe and the cross-section of which remains unaltered, a speed-controlled governor for said turbine, means operable by said governor to control the pitch of the propeller screw and thereby the output of fuel passing through the delivery pipe, a predetermined output of fuel producing at a predetermined altitude a constant speed of rotation of the propeller screw, a second pipe branched on said delivery pipe in the part of the same which is comprised between said restricted orifice and the branching of the by-pass, a chamber connected with said branched pipe, a piston reciprocable in said chamber under the action of the pressure existing in said part of the delivery pipe, a spring in contact with said piston the state of compression of which is controlled by the position of said piston, means whereby the spring acts on the speed of operation of the governor in accordance with its state of compression, altitude control means for regulating the action of said adjusting means and a barometric capsule controlling said altitude control means, whereby the pressure existing in the part of said delivery pipe located downstream said restricted orifice is maintained for each operative position of the governor at the value attained before said governor begins to act on said pitch controlling means.

6. In a gas turbine plant operatively associated with a propeller the combination comprising means for changing the pitch of said propeller, a speed controlled governor controlling said pitch changing means, a low pressure fuel pump, a delivery pipe for said pump opening into the input of the turbine combustion chamber, a bypass for said delivery pipe to return a portion of the delivered fuel back from the delivery pipe into the input of the pump, control means in said bypass to positively adjust the pressure in said bypass, a calibrated orifice in said delivery pipe, means for controlling the predetermined value of the speed at which said speed controlled governor becomes operative for modifying the pitch of said propeller dependent upon the action of the pressure inside said delivery pipe upstream of said orifice and a valve responsive to the altitude controlling the fuel supplied to said chamber located between said orifice and said last named means whereby at any percentage of the maximum output of power the speed is maintained constant despite the fact that the maximum horse power that the engine can deliver varies with the altitude since the fuel flow required changes as a function of the altitude for any given percentage of the maximum horsepower.

References Cited in the file of this patent

UNITED STATES PATENTS

| | | |
|---|---|---|
| 2,474,033 | Chamberlin et al. | June 21, 1949 |
| 2,508,260 | Holley | May 16, 1950 |
| 2,545,698 | Holley et al. | Mar. 20, 1951 |
| 2,552,231 | Streid et al. | May 8, 1951 |
| 2,564,127 | Orr | Aug. 14, 1951 |
| 2,604,756 | Greenland | July 29, 1952 |
| 2,616,507 | Greenland | Nov. 4, 1952 |